United States Patent Office 3,539,349
Patented Nov. 10, 1970

3,539,349
FOGGED DIRECT POSITIVE SILVER HALIDE EMULSIONS CONTAINING QUATERNATED MEROCYANINE DYES
Leslie G. S. Brooker and Frank G. Webster, Rochester, N.Y., assignors to Eastman Kodak Company, Rochester, N.Y., a corporation of New Jersey
No Drawing. Filed Sept. 8, 1967, Ser. No. 666,513
Int. Cl. G03c 1/08
U.S. Cl. 96—130                     24 Claims

ABSTRACT OF THE DISCLOSURE

Direct positive silver halide emulsions are sensitized with quaternated merocyanine dyes. Novel quaternated merocyanine dyes are provided which contain a desensitizing nucleus.

---

This invention relates to quaternated merocyanine dyes, to methods for preparing these dyes and to photographic emulsions prepared with these dyes.

Merocyanine dyes including quaternated and complex merocyanine dyes have been proposed hitherto as spectral sensitizers for conventional, negative photographic silver halide emulsions. However, such known merocyanine dyes have shown at best only weak sensitizing action, and, accordingly, have had but limited utility in photographic systems. For example, in Sprague, U.S. Pat. No. 2,263,018, issued Nov. 18, 1941, it is clearly indicated that quaternated merocyanine dyes are primarily useful as filter dyes in photographic applications.

We have now made the surprising discovery that certain quaternated merocyanine dyes are powerful sensitizers for direct positive photographic reversal systems, especially with fogged direct positive silver halide emulsions, that are characterized by both good speed and desired selective sensitivity to radiation in the blue to red range region of the spectrum with maximum sensitivity occurring in most cases in the region of about 475 to 550 nm. The images produced with these new direct positive emulsions containing one or more of the quaternated merocyanine dyes of the invention are clear and sharp, and of excellent contrast.

It is, accordingly, an object of this invention to provide a new class of quaternated merocyanine dyes that function as electron acceptors and spectral sensitizers for direct positive photographic emulsions. Another object of this invention is to provide new and improved direct positive photographic silver halide emulsions, especially fogged direct positive emulsions, containing one or more of the quaternated merocyanine dyes of the invention. A further object of this invention is to provide photographic elements comprising a support having thereon at least one layer containing a novel direct positive emulsion of this invention. Another object is to provide means for preparing such novel dyes and photographic materials of this invention. Other objects will be apparent from this disclosure and the appended claims.

In acordance with the invention direct positive emulsions are sensitized with quaternated merocyanine dyes comprising first and second 5- to 6-membered nitrogen containing heterocyclic nuclei joined by a methine linkage; the first of said nuclei being selected from a 2-isoxazolin-5-one nucleus joined at the 4-carbon atom thereof to said linkage, a 2-pyrazolin-5-one nucleus joined at the 4-carbon atom thereof to said linkage, or a complex fused pyrimidinedione nucleus joined at the 3-carbon atom thereof to said linkage; and said second nucleus being a sensitizing or desensitizing nucleus joined at a carbon atom thereof to said linkage to complete said quaternated merocyanine dye. The "complex fused pyrimidinedione" nuclei employed in the dyes of this invention feature a fused nucleus attached at one nitrogen atom and the 6-carbon atom of the pyrimidinedione nucleus. The fused nucleus can be a cyclic nucleus, such as a heterocyclic ring.

The preferred highly useful class of the merocyanine dye compounds of the invention include those represented by one of the following general formulas.

I. 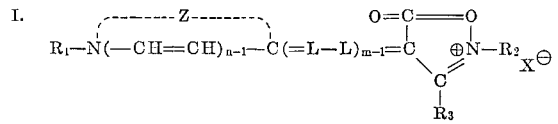

II. 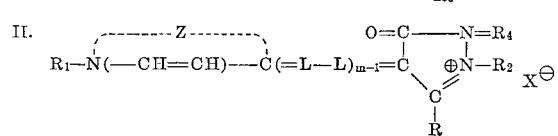

and

III. 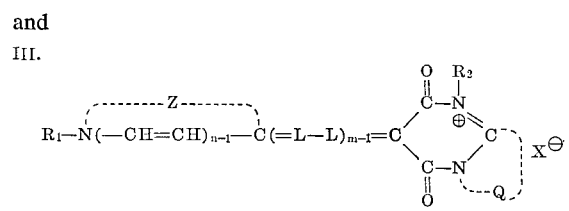

wherein $n$ and $m$ each represents a positive integer of from 1 to 2; L represents a methine linkage, e.g., —CH=, —C(CH$_3$)=, —C(C$_6$H$_5$)=, etc.; R$_1$ and R$_2$ each represents an alkyl group, including substituted alkyl (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups (preferably a substituted lower alkyl containing from 1 to 4 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc., a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc., or an aralkyl group, e.g., benzyl, phenethyl, etc., and the like; an alkenyl group, e.g., allyl, 1-propenyl, 2-butenyl, etc., and the like; R represents hydrogen, or an alkyl group (preferably a lower alkyl containing 1 to 4 carbon atoms), e.g., methyl, ethyl, propyl, isopropyl, butyl, etc.; R$_3$ and R$_4$ each represents an alkyl group (preferably containing from 1 to 4 carbon atoms), e.g., methyl, ethyl, propyl, isopropyl, butyl, etc., or an aryl group, e.g., phenyl, tolyl, xylyl, naphthyl, methoxyphenyl, cyanophenyl, nitrophenyl, chlorophenyl, 2,5-dichlorophenyl, 2,4,6-trichlorophenyl, etc.; X represents an acid anion, e.g., chloride, bromide, iodide, thiocyanate, sulfamate, perchlorate, p-toluenesulfonate, methyl sulfate, ethyl sulfate, etc.; Z represents the non-metallic atoms necessary to complete a sensitizing or, preferably, a desensitizing heterocyclic nucleus containing from 5 to 6 atoms in the heterocyclic ring, which nucleus may contain a second hetero atom such as oxygen, sulfur, selenium or nitrogen, such as the following nuclei: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 4- or 5-nitrobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 6-nitrobenzothiazole, 5-bromobenzothiazole, 6-bromobenzothiazole, 5-chloro-6-nitrobenzothiazole, 4-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6 - dioxymethylenebenzothiazole, 5-hydroxybenzothiazole, 6-hydroxybenzothiazole, α-naphthothiazole, β-naphthothiazole, β,β-naphthothiazole, 5 - methoxy-β,β-naphthothiazole, 5-ethoxy-β-naphthothiazole, 8-methoxy-α-naphthothiazole, 7-methoxy-α-naphthothiazole, 4'-methoxythianaphtheno-7',6',4,5-thiazole, nitro group substituted naphthothiazoles, etc.; an oxazole nucleus, e.g., 4-methyloxazole, 4-nitro-oxazole, 5-methyloxazole, 4-phenyloxazole, 4,5-diphenyloxazole, 4-ethyloxazole, 4,5-dimethoxazole, 5-phenyloxazole, benzoxazole, 5-chlorobenzoxazole, 5-methylbenzoxazole, 5-phenylbenzoxazole, 5- or 6-nitrobenzoxazole, 5-chloro-6-nitrobenzoxazole, 6-methylbenzoxazole, 5,6-dimethylbenzoxazole, 4,6 - dimethylbenzoxazole, 5 - methoxybenzoxazole, 5-ethoxybenzoxazole, 5-chlorobenzoxazole, 6-methoxybenzoxazole, 5-hydroxybenzoxazole, 6-hydroxybenzoxazole, α-naphthoxazole, β-naphthoxazole, nitro group substituted naphthoxazoles, etc.; a selenazole nucleus, e.g., 4-methylselenazole, 4-nitroselenazole, 4-phenylselenazole, benzoselenazole, 5-chlorobenzoselenazole, 5-methoxybenzoselenazole, 5-hydroxybenzoselenazole, 5- or 6-nitrobenzoselenazole, 5-chloro-6-nitrobenzoselenazole, tetrahydrobenzoselenazole, α-naphthoselenazole, β-naphthoselenazole, nitro group substituted naphthoselenazoles, etc.; a thiazoline nucleus, e.g., thiazoline, 4-methylthiazoline, 4-nitrothiazoline, etc.; a pyridine nucleus, e.g., 2-pyridine, 5-methyl-2-pyridine, 4-pyridine, 3-methyl-4-pyridine, nitro group substituted pyridines, etc.; a quinoline nucleus, e.g., 2-quinoline, 3-methyl-2-quinoline, 5-ethyl-2-quinoline, 6-chloro-2-quinoline, 6-nitro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 6-nitro-4-quinoline, 7-methyl-4-quinoline, 8-chloro-4-quinoline, 1-isoquinoline, 6-nitro-1-isoquinoline, 3,4-dihydro-1-isoquinoline, 3-isoquinoline, etc.; a 3,3-dialkylindolenine nucleus, preferably having a nitro or cyano substituent, e.g., 3,3-dimethyl-5 or 6-nitroindolenine, 3,3-dimethyl-5- or 6-cyanoindolenine, etc.; and, an imidazole nucleus, e.g., imidazole, 1-alkylimidazole, 1-alkyl-4-phenylimidazole, 1-alkyl-4,5-dimethylimidazole, benzimidazole, 1-alkylbenzimidazole, 1-aryl-5,6-dichlorobenzimidazole, 1-alkyl-α-naphthimidazole, 1-aryl-β-naphthimidazole, 1-alkyl-5-methoxy-α-naphthimidazole, or, an imidazo[4,5-b]quinoxaline nucleus, e.g., 1,3-dialkylimidazo[4,5-b]quinoxaline such as 1,3-diethylimidazo[4,5-b]quinoxaline, 6-chloro-1,3-diethylimidazo[4,5-b]quinoxaline, etc., 1,3-dialkenyl-imidazo[4,5-b]quinoxaline such as 1,3-diallylimidazo[4,5-b]quinoxaline, 6-chloro-1,3-diallylimidazo[4,5-b]quinoxaline, etc., 1,3-diarylimidazo[4,5-b]quinoxaline such as 6,7-dichloro - 1,3 - diphenylimidazo[4,5-b]quinoxaline, 1,3-phenylimidazo[4,5-b]quinoxaline, 6-chloro-1,3-diphenylimidazo[4,5-b]quinoxaline, etc.; and Q represents the nonmetallic atoms required to complete a fused heterocyclic ring containing from 5 to 6 atoms in said ring, which ring may contain a second hetero atom such as oxygen, sulfur, selenium, or nitrogen, such as the following nuclei; a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 6-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, α-naphthothiazole, β-naphthothiazole, 5-methoxy-β,β-naphthothiazole, 5-ethoxy-β-naphthothiazole, 8-methoxy-α-naphthothiazole, 7 - methoxy-α-naphthothiazole, 4'-methoxythianaphtheno-7',6',4,5-thiazole, etc.; an oxazole ring, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chloronaphthoxazole, 6-methoxybenzoxazole, 5-hydroxybenzoxazole, 6-hydroxybenzoxazole, α-naphthoxazole, β-naphthoxazole, etc.; a selenazole ring, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, α-naphthoselenazole, β-naphthoselenazole, etc.; a thiazoline ring, e.g., thiazoline, 4-methylthiazoline, etc.; a pyridine ring, e.g., pyridine, 3-methylpyridine, 4-methylpyridine, etc.; a quinoline ring, e.g., quinoline, 3-methylquinoline, 5-ethylquinoline, 6-chloroquinoline, 8-chloroquinoline, 6-methoxyquinoline, etc.; a 3,3-dialkylindolenine ring, e.g., 3,3-dimethylindolenine, 3,3-diethylindolenine, etc.; an imidazole ring, e.g., imidazole, 1-alkylimidazole, 1-alkyl-4,5-dimethylimidazole, benzimidazole, 1-alkylbenzimidazole, 1-aryl-5,6-dichlorobenzimidazole, 1 - alkyl-naphthimidazole, 1-aryl-β-naphthimidazole, 1-alkyl-5-methoxy-α-naphthimidazole, etc., and the like. Nuclei wherein Z completes an imidazo[4,5-b]quinoxaline nucleus, or a nitro group substituted thiazole, oxazole, selenazole, thiazoline, pyridine, quinoline or imidazole nucleus are desensitizing nuclei. From the foregoing, it will be apparent that Z constitutes the atoms necessary to complete a heterocyclic nitrogen containing nucleus of the type used in the production of merocyanine dyes.

Another highly useful class of the merocyanine dyes of the invention include those represented by the following general formula:

IV.

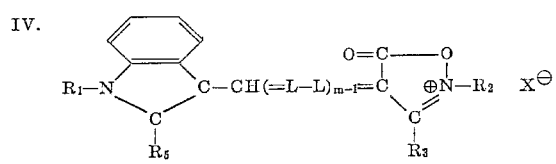

wherein $m$, L, $R_1$, $R_2$ and $R_3$ are as previously defined, and $R_5$ represents an aryl group (e.g., phenyl, tolyl, xylyl, naphthyl, methoxyphenyl, cyanophenyl, nitrophenyl, chlorophenyl, etc.).

Another highly useful class of the merocyanine dyes of the invention include those represented by the following formula:

V.

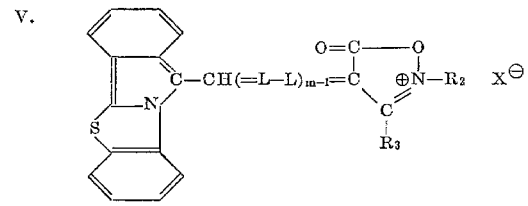

wherein $m$, L, $R_2$ and $R_3$ are as previously defined.

In accordance with another embodiment of this invention, novel quaternated merocyanine dyes are provided comprising first and second 5- to 6-membered nitrogen heterocyclic nuclei joined by a methine linkage; the first of said nuclei being selected from the group consisting of a 2-isoxazolin-5-one nucleus joined at the 4-carbon thereof to said linkage; a 2-pyrazolin-5-one nucleus joined at the 4-carbon atom thereof to said linkage, and a complex fused pyrimidinedione nucleus joined at the 3-carbon atom thereof to said linkage; and, said second nucleus being a desensitizing nucleus joined at a carbon atom thereof to said linkage to complete said quaternated merocyanine dye. These novel dyes include those having Formula IV above, and those having Formula I, II and III wherein Z represents the atoms required to complete a desensitizing nucleus.

As used herein "desensitizing nucleus" refers to those nuclei which, when converted to a symmetrical carbocyanine dye and added to gelatin silver chlorobromide emulsion containing 40 mole percent chloride and 60 mole percent bromide, at a concentration of from 0.01 to 0.2 gram dye per mole of silver, cause by electron trapping at least about an 80 percent loss in the blue speed of the emulsion when sensitometrically exposed and developed three minutes in Kodak developer D–19 at room temperature. Advantageously, the desensitizing nuclei are those which, when converted to a symmetrical carbocyanine dye and tested as just described, essentially completely desensitize the test emulsion to blue radiation (i.e., cause more than about 90 to 95% loss of speed to blue radiation).

The quaternated merocyanine dyes of the invention defined by Formulas I and II above can be prepared by various methods. For example, one convenient method for many of these dyes comprises heating a mixture of (1) a heterocyclic compound of the formula:

VI.
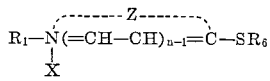

wherein $n$, $R_1$, X and Z are as previously defined, and $R_6$ represents an alkyl or aryl group, e.g., methyl, ethyl, phenyl, etc., and (2) a heterocyclic compound such as represented by the following formulas:

VII.
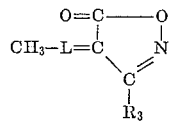

and

VIII.
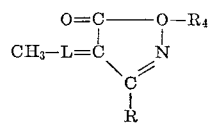

wherein L, R, $R_3$ and $R_4$ are as previously defined, in approximately equimolar proportions, in the presence of a condensing agent such as triethylamine, in an inert solvent such as ethanol. The crude dyes are separated from the reaction mixtures and purified by one or more recrystallizations from appropriate solvents. The purified dyes are then converted to the corresponding quaternary salts by heating them with conventional quaternizing reagents such as dimethyl sulfate, methyl p-toluenesulfonate, etc., followed by chilling and one or more recrystallizations.

Another convenient method for preparing many of the quaternated merocyanine dyes defined by Formulas I and II above comprises condensing (1) a heterocyclic compound of the formula:

IX.
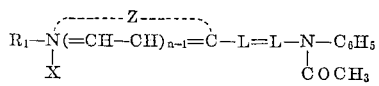

wherein $n$, L, $R_1$, X and Z are as previously defined, with (2) a heterocyclic compound defined by Formulas VII and VIII above, or a 3-aryl-2-isoxazolin-5-one, or a 3-aryl-2-pyrazolin-5-one, in approximately equimolar proportions, in an inert solvent medium such as ethanol. The crude dyes obtained are separated and purified by one or more recrystallizations from appropriate solvents. The purified dyes are then quaternated by conventional methods such as described above and as set forth in the examples hereinafter.

The quaternated merocyanine dyes of the invention defined by Formula III above are conveniently prepared, for example, by condensing (1) a heterocyclic compound of the formula:

X.
$$R_1-N(=CH-CH)_{n-1}=C-R_7$$

wherein n, $R_1$, X and Z are as previously defined, and $R_7$ represents an alkyl group, e.g., methyl, ethyl, benzyl, etc., with (2) a heterocyclic compound of the formula:

XI.
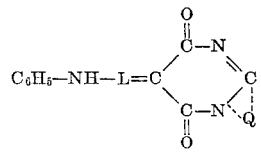

wherein L and Q are as previously defined, in approximately equimolar proportions, in the presence of a basic condensing agent such as triethylamine, in an inert solvent medium. The crude dyes are separated and purified by one or more recrystallizations from appropriate solvents. The purified dyes are then quaternated by conventional methods such as previously described and as set forth in the examples hereinafter. For further details of preparing the intermediate unquaternated merocyanine dyes of this class, reference can be had to copending application of F. G. Webster et al., Ser. No. 639,024, filed May 17, 1967.

The quaternated merocyanine dyes of the invention such as defined by Formula IV above can be readily prepared by condensing (1) a heterocyclic compound of the formula:

XII.
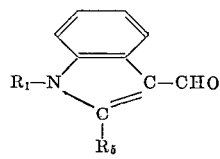

wherein $R_1$ and $R_5$ are as previously defined, with (2) a 3-aryl-2-oxazolin-5-one, in approximately equimolar proportions, in a manner generally similar to the procedures described in the above methods, followed by converting the purified dye to a quaternated salt by conventional methods are described previously and as set forth in the example hereinafter.

The quaternated merocyanine dyes of the invention such as defined by Formula V above are readily prepared by condensing (1) a compound such as 11-isoindolo-[1,2-b]benzothiazole carboxaldehyde with (2) a 3-aryl-2-isoxazolin-5-one, in approximately equimolar proportions, at elevated temperatures, and in an inert solvent medium such as acetic acid. The dye obtained is then quaternated by conventional methods such as previously described and as set forth in the examples hereinafter.

In accordance with the invention, novel and improved direct positive photographic silver halide emulsions are prepared by incorporating one or more of the quaternated merocyanine dyes of the invention into a suitable fogged silver halide emulsion. The emulsion can be fogged in any suitable manner, such as by light or with chemical fogging agents, e.g., stannous chloride, formaldehyde, thiourea dioxide, and the like. The emulsion may be fogged by the addition thereto of a reducing agent, such as thiourea dioxide, and a compound of metal more electropositive than silver, such as a gold salt, for example, potassium chloroaurate, as described in British Pat. 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, $(NH_4)_2PdCl_6$ and the like.

Useful concentrations of reducing agent and metal compound (e.g., metal salt) can be varied over a considerable range. As a general guideline, good results are obtained using about .05 to 40 mg. reducing agent per mole of silver halide and 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in developer Kodak DK–50 having the composition set forth below, when the emulsion is coated at a silver coverage of 50 mg. to 50 mg. per square foot.

DEVELOPER

| | G. |
|---|---|
| N-methyl-p-aminophenol sulfate | 2.5 |
| Sodium sulfite (anhydrous) | 30.0 |
| Hydroquinone | 2.5 |
| Sodium metaborate | 10.0 |
| Potassium bromide | 0.5 |

Water to make 1.0l.

The dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, in the outer shell of such emulsions. These emulsions can be prepared in various ways, such as those described in Berriman U.S. patent application Ser. No. 448,467, filed Apr. 15, 1965 new U.S. Pat. 3,367,778 issued Feb. 6, 1968. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make it developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

DEVELOPER A

| | G. |
|---|---|
| N-methyl-p-aminophenol sulfate | 2.5 |
| Ascorbic acid | 10.0 |
| Potassium metaborate | 35.0 |
| Potassium bromide | 1.0 |

Water to 1l.
pH of 9.6.

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Sauvenier in Science et Industries Photographiques, vol. XXVIII, January 1957, pages 1 to 23 and January 1957, pages 57 to 65 are particularly useful. Such chemical sensitization includes three major classes, namely, gold or noble metal sensitization, sulfur sensitization, such as by a labile sulfur compound, and reduction sensitization, e.g., treatment of the silver halide with a strong reducing agent which introduces small specks of metallic silver into the silver salt crystal or grain.

The dyes of this invention are highly useful electron acceptors in high speed direct positive emulsions comprising fogged silver halide grains and a compound which accepts electrons, as described and claimed in Illingsworth U.S. patent application Ser. No. 609,794, filed Jan. 17, 1967, and titled "Photographic Reversal Materials III," now abandoned, and continuation-in-part thereof Ser. No. 619,936 filed Mar. 2, 1967. The fogged silver halide grains of such emulsions are such that a test portion thereof, when coated as a photographic silver halide emulsion on a support to give a maximum density of at least about one upon processing for six minutes at about 68° F. in Kodak DK–50 developer, has a maximum density which is at least about 30% greater than the maximum density of an identical coated test portion which is processed for six minutes at about 68° F. in Kodak DK–50 developer after being bleached for about 10 minutes at about 68° F. in a bleach composition of:

Potassium cyanide—50 mg.
Acetic acid (glacial)—3.47 c.c.
Sodium acetate—11.49 g.
Potassium bromide—119 mg.
Water to 1 liter The grains of such emulsions will lose at least about 25% and generally at least about 40% of their fog when bleached for ten minutes at 68° F. in a potassium cyanide bleach composition as described herein. This fog loss can be illustrated by coating the silver halide grains as a photographic silver halide emulsion on a support to give a maximum density of at least 1.0 upon processing for six minutes at about 68° F. in Kodak DK–50 developer and comparing the density of such a coating at about 68° F. in Kodak DK–50 developer and comparing the density of such a coating with an identical coating which is processed for six minutes at 68° F. in Kodak DK–50 developer after being bleached for about 10 minutes at 68° F. in the potassium cyanide bleach composition. As already indicated, the maximum density of the unbleached coating will be at least 30% greater, generally at least 60% greater, than the maximum density of the bleached coating.

The silver halides employed in the preparation of the photographic emulsions useful herein include any of the photographic silver halides as exemplified by silver bromide, silver iodide, silver chloride, silver chlorobromide, silver bromoiodide, silver chlorobromide, and the like. Silver halide grains having an average grain size less than about one micron, preferably less than about 0.5 micron, give particularly good results. The silver halide grains can be regular and can be any suitable shape such as cubic or octahedral, as described and claimed in Illingsworth U.S. pattent application Ser. No. 609,778, filed Jan. 17, 1967, and titled "Direct Positive Photographic Emulsions I," now abandoned, and continuation-in-part thereof Ser. No. 619,909 filed Mar. 2, 1967. Such grains advantageously have a rather uniform diameter frequency distribution, as described and claimed in Illingsworth U.S.

patent application Ser. No. 609,790, filed Jan. 17, 1967, and titled "Photographic Reversal Emulsions II," now abandoned, and continuation-in-part thereof Ser. No. 619,948 filed Mar. 2, 1967. For example, at least 95%, by weight, of the photographic silver halide grains can have a diameter which is within about 40%, preferably within about 30% of the mean grain diameter. Mean grain diameter, i.e., average grain size, can be determined using conventional methods, e.g., as shown in an article by Trivelli and Smith entitled "Empirical Relations Between Sensitometric and Size-Frequency Characteristics in Photographic Emulsion Series" in The Photographic Journal, vol. LXXIX, 1949, pages 330–338. The fogged silver halide grains in these direct-positive photographic emulsions of this invention produce a density of at least 0.5 when developed without exposure for five minutes at 68° F. in Kodak DK–50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about ten mole percent iodide. The photographic silver halides can be coated at silver coverages in the range of about 50 to about 500 milligrams of silver per square foot of support.

In the preparation of the above photographic emulsions, the dyes of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The binding agents for the emulsion layer of the photographic element can also contain dispersed polymerized vinyl compounds. Such compounds are disclosed, for example, in U.S. Pats. 3,142,568; 3,193,386; 3,062,674 and 3,220,844 and include the water insoluble polymers of alkyl acrylates and methacrylates, acrylic acid, sulfoalkyl acrylates or methacrylates and the like.

The dyes, reducing agents and metal compounds of the invention can be used with emulsions prepared, as indicated above, with any of the light-sensitive silver halide salts including silver chloride, silver bromide, silver chlorobromide, silver bromoiodide, silver chlorobromoiodide, etc. Particularly useful are direct positive fogged emulsions in which the silver salt is a silver bromohalide comprising more than 50 mole percent bromide. Certain dyes of this invention are also useful in emulsions which contain color formers.

The novel emulsions of this invention may be coated on any suitable photographic support, such as glass, film base such as cellulose acetate, cellulose acetate butyrate, polyesters such as poly(ethylene terephthalate), paper, baryta coated paper, polyolefin coated paper, e.g., polyethylene or polypropylene coated paper, which may be electron bombarded to promote emulsion adhesion, to produce the novel photographic elements of the invention.

The invention is further illustrated by the following examples.

Example 1.—1,3 - diethyl - 2 - [(2 - methyl - 5 - oxo - 3 - phenyl - 3 - isoxazolin - 4 - yl)vinyl]imidazo[4,5 - b] quinoxalinium iodide

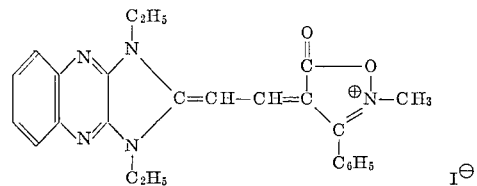

A mixture of 3.1 g. (1 mol.) of 4-[1,3-diethyl-2(1H)-imidazo - [4,5 - b]quinoxalinylidene)ethylidene] - 3 - phenyl-2-isoxazolin-5-one and 5 ml. of freshly distilled dimethylsulfate is refluxed for 2 minutes. The reaction mixture is cooled, the viscous liquid is stirred in ether and the ether layer decanted. After another ether treatment the crude dye is dissolved in ethanol and the solution poured into aqueous potassium iodide. After the precipitate has had two recrystallizations from ethanol (45 ml./g.), the yield of red-orange needles is 45% with a melting point of 180–183° C., with decomposition.

The above prepared dye containing the desensitizing 1,3-diethylimidazo[4,5-b]quinoxaline nucleus is photographically tested for its usefulness as an electron acceptor and spectral sensitizer for fogged direct positive photographic silver halide emulsions by the following procedure.

A gelatin silver bromoiodide emulsion (2.5 mole percent of the halide being iodide) and having an average grain size of about 0.2 micron is prepared by adding an aqueous solution of potassium bromide and potassium iodide, and an aqueous solution of silver nitrate, simultaneously to a rapidly agitated aqueous gelatin solution at a temperature of 70° C., over a period of about 35 minutes. The emulsion is chill-set, shedded and washed by leaching with cold water in the conventional manner. The emulsion is reduction-gold fogged by first adding 0.2 mg. of thiourea dioxide per mole of silver and heating for 60 minutes at 65° C. and then adding 4.0 mg. of potassium chloroaurate per mole of silver and heating for 60 minutes at 65° C. The dye of the above example, 1,3-diethyl-2[(2-methyl-5-oxo - 3 - phenyl - 3 - isoxazolin - 4 - yl)vinyl]imidazo [4,5-b]quinoxalinium iodide, is then added to the above fogged emulsion in amount sufficient to give a concentration of 0.08 gram of the dye per mole of silver. The resulting emulsion is coated on a cellulose acetate film support at a coverage of 100 mg. of silver and 400 mg. of gelatin per square foot of support.

A sample of the coated support is then exposed on an Eastman Ib sensitometer using a tungsten light source and processed for 6 minutes at room temperature in Kodak D–19 developer which has the following composition:

| | G. |
|---|---|
| N-methyl-p-aminophenol sulfate | 2.0 |
| Sodium sulfite (anhydrous) | 90.0 |
| Hydroquinone | 8.0 |
| Sodium Carbonate (monohydrate) | 52.5 |
| Potassium bromide | 5.0 |
| Water to make 1 liter. | | then fixed, washed and dried. The results are listed in Table I hereinafter. Referring thereto, it will be seen that the dye of this example has a maximum density in the unexposed areas of 1.82 and a minimum density in exposed areas of 0.36, a maximum sensitivity of 495 nm. and a relative speed of 1150. This result indicates that the dye compound of the above example is well suited to function as both an electron acceptor and spectral sensitizer. It thus provides excellent quality direct positive photographic silver halide emulsions. Excellent magenta images are obtained when the color former 1-(2,4,6-trichlorophenyl) - 3 - {3 - [(2,4 - di - tert - pentylphenoxy) acetamido]benzamido}-2-pyrazolin-5-one is incorporated in the emulsion of this example, the emulsion is coated on a support, exposed to a tungsten source through Wratten filter No. 61 and No. 16, and reversal processed as described in Graham et al. U.S. Pat. 3,046,129, issued July 24, 1962, in Example (a) Col. 27, lines 27 et seq. except that black-and-white (MQ) development is omitted, the color development is reduced to one minute and is conducted in total darkness until after fixing.

Example 2.—3 - ethyl - 2 - [(2 - methyl - 5 - oxo - 3 - phenyl - 3 - isoxazolin - 4 - yl)vinyl] - 6 - nitrobenzothiazolium methylsulfate

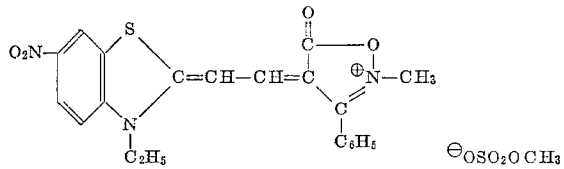

A mixture of 1.4 g. (1 mol.) of 4-[(3-ethyl-6-nitro-2-benzothiazolinylidene)ethylidene] - 3 - phenyl - 2 - isoxazolin-5-one and 5 ml. of dimethyl sulfate is treated as in Example 1. The crude dye is extracted using 300 ml. of ethanol. The dye is dissolved in hot m-cresol, the solution is filtered and ethanol is added. The yield of the resulting shiny dark crystals is 34% with a melting point of 221–223° C. with decomposition.

This dye containing the desensitizing 3-ethyl-6-nitrobenzothiazole nucleus is tested by the exact procedure described in above Example 1. The results as shown in Table 1 hereinafter indicate that this dye is an excellent electron acceptor and spectral sensitizer for fogged direct positive photographic emulsions, giving densities of 1.66 and 0.22 for the unexposed and exposed areas, respectively, with a maximum sensitivity at 510 nm. and a relative speed of 1380.

It will be apparent that other related intermediate unquaternated merocyanine dyes can also be quaternized by the procedure of the above example, and that such quaternated dyes have generally similar properties as electron acceptors and spectral sensitizers for direct positive photographic emulsions. Typical examples include the dye 3-ethyl-2-[(2-methyl-5-oxo-3-phenyl - 3 - isoxazolin-4-yl)vinyl]-6-nitrobenzoxazolium salt (e.g., the chloride, bromide, iodide, perchlorate, p-toluene-sulfonate, etc., salts), the dye 3-ethyl-2-[(2-methyl-5-oxo-3-phenyl-3-isoxazolin-4-yl)vinyl]-6-nitrobenzoselenazolium salt (e.g., the chloride, bromide, iodide, perchlorate, p-toluene-sulfonate salts), and the like.

Example 3.—1-methyl-3-[(2-methyl-5-oxo - 3 - phenyl-3-isoxazolin-4-yl)methylene]-2-phenyl-3H-indolium iodide

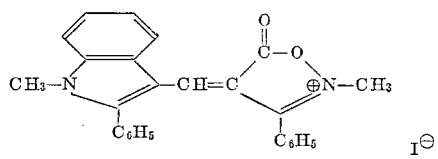

A mixture of 4.4 g. (1 mol) of 4-[(1-methyl-2-phenyl-3-indolyl)methylene]-3-phenyl-2-isoxazolin-5-one and 10 ml. of dimethylsulfate is treated as in Example 1. The crude dye is dissolved in ethanol and the solution poured into aqueous potassium iodide. The precipitate is subjected to two recrystallizations from ethanol (65 ml./g.). The yield of translucent red needles is 33% with a melting point of 150–157° C., with decomposition.

The above prepared dye containing the desensitizing 1-methyl-2-phenyl-3H-indole nucleus is photographically tested in accordance with the procedure described in above Example 1. The results are recorded in Table 1 hereinafter. Referring thereto, it will be seen that the densities are 1.84 and 0.056 for the unexposed and exposed areas, respectively, with a relative speed of 436. Accordingly, this dye functions effectively as an electron acceptor for fogged direct positive photographic emulsions.

Example 4.—2-[(2,3 - dimethyl-5-oxo-1-phenyl-3-pyrazolin-4-yl)vinyl]-1,3-diethylimidazo[4,5-b]quinoxalinium iodide

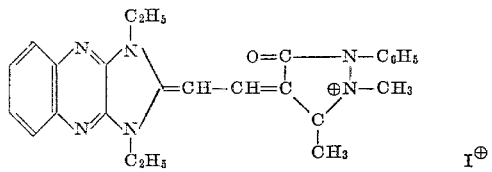

A mixture of 0.5 g. (1 mol) of 4-[(1,3-diethyl-2(1H)-imidazo[4,5-b]quinoxalinylidene)ethylidene] - 3 - methyl-1-phenyl-2-pyrazolin-5-one and 1 ml. of freshly distilled dimethylsulfate is heated to 150° C., then cooled. The crude dye is dissolved in ethanol, the solution poured into aqueous potassium iodide, and the precipitate is collected on a filter. After two recrystallizations from ethanol (160 ml./g.) the yield of shiny red needles is 50% with a melting point of 244–246° C., with decomposition.

This dye containing the desensitizing 1,3-diethyl-imidazo[4,5-b]quinoxaline nucleus is an effective electron acceptor and spectral sensitizer as indicated by the photographic test procedure of above Example 1. The values determined by the test are recorded in Table 1 hereinafter. Referring thereto, the densities are 1.74 and 1.05 for the unexposed and exposed areas, respectively, the maximum sensitivity is at 500 nm. and the relative speed is 603.

Example 5.—2-[(2,3 - dimethyl-5-oxo-1-phenyl-3-pyrazolin-4-yl)vinyl] - 3-ethyl-6-nitrobenzothiazolium methylsulfate

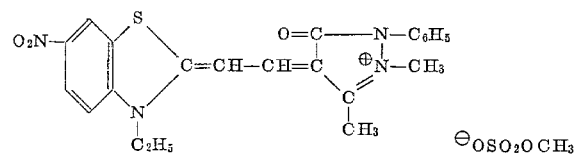

A mixture of 1.2 g. of 4-[(3-ethyl-6-nitro-2-benzothiazolinylidene)ethylidene]-3-methyl-2-pyrazolin-5-one and 5 ml. of freshly distilled dimethylsulfate is heated to 150° C., then cooled. The viscous liquid is stirred in three portions of ether, and then in successive portions of acetone until crystalline. The solid is extracted with 100 ml. of ethanol. Then ether is added to the extract and the resulting solid dye is collected on a filter. The yield of brownish crystals is 6% with a melting point of 248–250° C., with decomposition.

The above prepared dye containing the desensitizing 3-ethyl-6-nitrobenzothiazole nucleus is tested by the exact procedure described in above Example 1. The results as recorded in Table 1 hereinafter show densities of 2.26 and 0.60 for the unexposed and exposed areas, respectively, with a maximum sensitivity at 520 nm. and a relative speed of 479. Accordingly, this dye qualifies as a moderately good electron acceptor and spectral sensiitzer for fogged direct positive photographic emulsions.

Example 6.—11-[(2 - methyl-5-oxo-3-phenyl-3-isoxazolin-4 - yl)methylene] - isoindolo[1,2-b]benzothiazolium p-toluenesulfonate

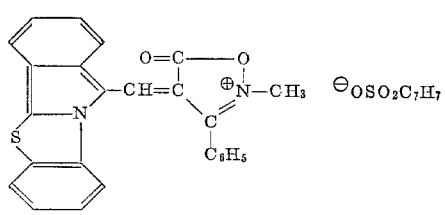

A mixture of 1.0 g. (1 mol.) of 11-isoindolo[1,2,-b]-benzothiazole carboxaldehyde[1] and 0.65 g. (1 mol.) of 3-phenyl-2-isoxazolin-5-one is heated two minutes at 90° C. in 10 ml. of acetic anhydride. The reaction mixture is cooled and methanol and water are added. After filtration the resulting solid is purified by dissolving in hot pyridine, filtering the solution and adding methanol to the filtrate. The solid dye that is collected is heated at 110–150° C. in methyl p-toluenesulfonate until reaction mixture turns yellow. After cooling, the viscous residue is washed with ether and then acetone. The resulting solid, after two treatments by dissolving in acetonitrile and precipitation with ether, gives a 32% yield of dye with a melting point of 246–247° C., with decomposition.

This dye containing the 1-isoindolo[1,2-b]benezothiazole nucleus is photographically tested in accordance with the procedure described in above Example 1. The results are recorded in Table I hereinafter. Referring thereto, it will be seen that a maximum density of 1.30 is obtained in the unexposed areas and that a relative speed of 871 is shown. From these results, it appears that this dye is especially useful to increase the blue speed of fogged direct positive emulsions. This dye also has utility as a filter dye in photographic layers.

Example 7.—3-ethyl - 2[(2-methyl - 5-oxo-1-phenyl - 3-pyrazolin-4-yl)-2 - phenylvinvyl/benzothiazolium p-toluenesulfonate

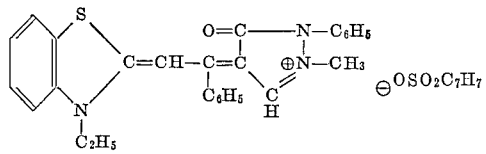

A mixture of 0.42 g. (1 mol) of 4-[3-ethyl-2-benzothiabolinylidene)-1-phenylethylidene]-1 - phenyl-2-pyrazolin-5-one and 0.4 g. (1 mol+100% excess) of methyl p-toluenesulfonate is heated until a change in color occurs. The reaction mixture is cooled and stirred in ether. The ether is decanted, the sticky residue is dissolved in methanol and precipitated with ether, the methanol-ether layer is decanted and the residue boiled in acetone until it is crystalline. The dye is purified by dissolving the solid in methanol, filtering the solution and precipitating the dye with ether. The yield of orange crystals is 46% with a melting point of 157–158° C. with decomposition.

This dye containing the sensitizing 3-ethylbenzothiazole nucleus is tested for photographic properties by the procedure of above Example E. The results are recorded in Table 1 hereinafter. The maximum density for the unexposed areas is 1.86, with a maximum sensitivity at 475 nm. and a relative speed of 138. Accordingly, these results indicate that this dye is especially useful to increase the blue speed of foged direct positive photographic emulsions. This dye is also useful as a filter dye in photographic filter layers.

Example 8.—1-ethyl - 4 - [2 - methyl-5-oxo-1-phenyl-3-pryrazolin-4-yl)-2-phenylvinyl]quinolinium p-toluene sulfonate

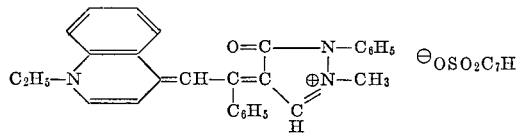

In the same manner as described in above Example 7, 1-ethyl-4-[(2-methyl - 5-oxo-1-phenyl-3-pyrazolin-4-yl)-2-phenylvinyl]quinolinium p-toluenesulfonate is prepared from 0.42 g. (1 mol.) of 4-[(1-ethyl-4(1H)-quinolylidene)-1-phenyl-ethylidene]-1 - phenyl-2-pyrazolin-5-one and 0.4 g. (1 mol. + 10% excess) of methyl p-toluenesulfonate. The yield of dull red needles is 25% with a melting point of 192–195° C., with decomposition.

---

¹ The 11-isoindolo[1,2-b]benzothiazol carboxaldehyde is prepared by a procedure given in J. Gen. Chem. USSR., vol. 33, 3646, 1963.

The above dye containing the sensitizing 1-ethyl-quinoline nucleus is tested for reversal and spectral sensitizing properties by the procedure described in above Example 1. The results are recorded in Table 1 hereinafter. Reference thereto indicates a maximum density in the unexposed areas of 1.82, with a maximum sensitivity at 450 nm. and a relative speed of 100. Accordingly, these results indicate that this dye is especially useful to increase the blue speed of fogged direct positive emulsions. This dye also has utility as a filter dye in photographic filter layers.

Example 9.—1,3,3-trimethyl - 2-[4(2-methyl - 5-oxo-1-phenyl-3-pyrazolin-4-yl)-4-phenyl-1,3-butadienyl]-2-indolinium iodide

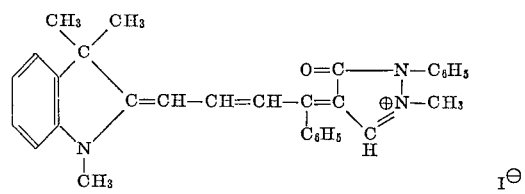

In a manner similar to Example 7, the above dye is prepared from 1.1 g. (1 mol) of 1-phenyl-4-[(1,3,3-trimethyl-2-indolinylidene)-1 - phenyl - 2 - butenylidene]-2-pyrazolin-5-one and 0.9 g. (1 mol)+100% excess) of methy p-toluenesulfonate, the crude dye is converted to iodide by dissolving in methanol and adding to the methanol solution aqueous potassium iodide. The resulting solid is extracted with hot xylenes and the residue washed with water. The dye iodide is purified by dissolving in methanol and adding aqueous potassium iodide. After another such treatment, the yield of dark purple crystals is 30% with a melting point of 200–201° C., with decomposition.

This dye containing the sensitizing 1,3,3-trimethyl-indole nucleus is tested for reversal and spectral sensitizing properties by the procedure of Example 1. The results are recorded in Table 1 hereinafter. Reference thereto shows a maximum density of 1.72 for the unexposed areas, and a relative speed of 240. Accordingly, this dye provides desirable increased speed for fogged direct positive emulsions. It also has utility as a filter dye in photographic filter layers.

Example 10.—1,3,3 - trimethyl - 2 - [(2-methyl-5-oxo-3-phenyl-3-isoxazolin - 4 - yl)vinyl]-2-indolinium p-toluenesulfonate

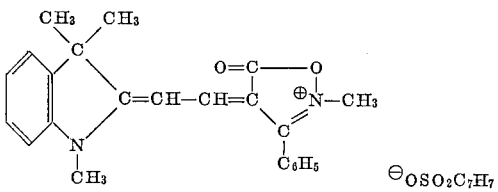

In the same manner as Example 7, the above dye is prepared from 1.2 g. (1 mol.) of 4-[(1,3,3-trimethyl-2-indolinylidene)ethylidene] - 3 - phenyl-2-isoxazolin-5-one² and 1.2 g. (1 mol.+100% excess) methyl p-toluenesulfonate. The yield of bright yellow plates is 20% with a melting point of 169–172° C., with decomposition.

The above prepared dye containing the sensitizing 1,3,3-trimethylindole nucleus is tested for reversal and spectral sensitizing properties by the procedure described in above Example 1. The results are recorded in Table 1 hereinafter. Referring thereto, it will be seen that the maximum density in the unexposed areas is 1.96, that the maximum sensitivity is at 480 nm. and that the relative speed is 417. Accordingly, this dye is especially useful to increase the blue speed of fogged direct positive emulsions. It also is useful as a filter dye in photographic filter layers.

---

² This compound is M61 of Color and Constitution X, Journal American Chemical Society, 73, 5332 (1951).

Example 11.—3 - ethyl - 2-[(2-methyl-5-oxo-3-phenyl-3-isoxazolin - 4 - yl)vinyl]-benzothiazolium p-toluenesulfonate

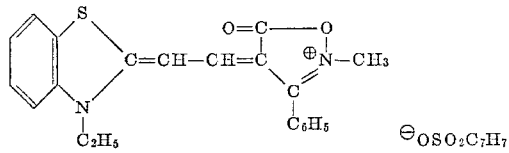

In the same manner as Example 7, the above dye is prepared from 0.6 g. (1 mol.) of 4-[(3-ethyl-2-benzothiazolinylidene)ethylidene] - 3 - phenyl-2-isoxazolin-5-one and 0.6 g. (1 mol.) of methyl p-toluenesulfonate. The yield of dull yellow needles is 64%, melting point of 207–209° C., with decomposition.

The above prepared dye containing the sensitizing 3-ethylbenzothiazole nucleus is tested by the procedure described in above Example 1. The results are recorded in Table 1 hereinafter. Reference thereto shows densities of 1.84 and 0.84 for the unexposed and exposed areas, respectively, with a maximum sensitivity in the blue region, and a relative speed of 363. These results indicate that this dye is an effective electron acceptor for fogged direct positive emulsions in the blue region of the spectrum.

Example 12.—3 - [1,3 - diethyl - 2(1H)-imidazo[4,5-b]quinoxalinylidene)ethylidene] - 3,4 - dihydro-1-methyl-2,4-dioxo - 2H - pyrido[1,2-a]pyrimidinium iodide

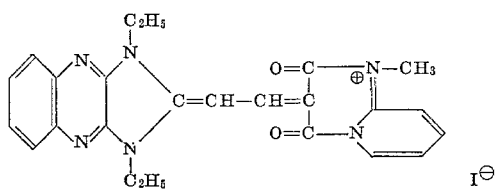

A mixture of 0.9 g. (1 mol.) of 3-[(1,3-diethyl-2(1H)-imidazo[4,5-b]quinoxalinylidene)ethylidene] - 2H-pyrido[1,2-a]-pyrimidine-2,4(3H) dione and approximately 2 ml. of freshly distilled dimethylsulfate is heated to the refluxing temperature, the reaction mixture is cooled and the viscous liquid is washed several times with ether. The residue is dissolved in ethanol and the solution is poured into aqueous potassium iodide. The precipitate is dissolved in hot m-cresol, the solution filtered and the ethanol is added to the filtrate. After cooling, the dye is collected on a filter and dissolved in 25 ml. of hot methanol containing one drop of acetic acid, the solution is filtered, the filtrate is chilled and the dye is collected on a filter. The yield of rust-red crystals is 17% with a melting point of 290–295° C., with decomposition.

The above prepared dye containing the desensitizing 1,3-diethylimidazo[4,5-b]quinoxaline nucleus is tested by the procedure of above Example 1. The results are recorded in Table 1 hereinafter. Referring thereto, it will be seen that the densities are 2.36 and 1.44 for the unexposed and exposed areas, respectively, with a maximum sensitivity at 540 nm. and a relative speed of 692. Accordingly, this dye is an effective electron acceptor and spectral sensitizer for fogged direct positive emulsions.

Example 13.—3 - [(1,3 - diethyl-2(1H)-imidazo[4,5-b]quinoxalinylidene)ethylidene] - 3,4 - dihydro-1-methyl-2,4 - dioxo - 2H-pyrimido[2,1-b]benzothiazolium iodide

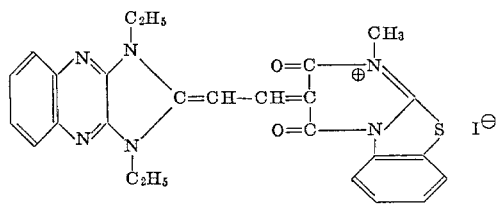

A mixture of 0.5 g. (1 mol.) of 3-[(1,3-diethyl-2-(1H)-imidazo[4,5 - b]quinoxalinylidene)ethylidene] - 2H - py-rimido[2,1-b]benzothiazole-2,4-(3H)-dione and approximately 2 ml. of freshly distilled dimethylsulfate is heated to 130° C. for 2 minutes. The reaction mixture is cooled and the viscous liquid is stirred in acetone until crystalline. The crude dye is dissolved in ethanol, and the solution is poured into aqueous potassium iodide and the precipitate collected on a filter. After two recrystallizations from 40 ml. of methanol containing one drop of acetic acid, the yield of very dark red crystals is 7% with a melting point of 267–268° C., with decomposition.

This dye containing the desensitizing 1,3-diethyl-imidazo[4,5-b]quinoxaline nucleus is tested by the procedure of Example 1. The results are recorded in Table 1 hereinafter. Reference thereto indicates densities of 2.34 and 1.18 for the unexposed and exposed areas, respectively, with a maximum sensitivity at 530 nm. and a relative speed of 525. Accordingly, this dye is an effective electron acceptor and spectral sensitizer for fogged direct positive emulsions.

The following Examples 14 to 17 illustrate the preparation of some of the unquaternated merocyanine dye intermediates that are employed in the preceding examples. Example 18 illustrates the preparation of the 2-pyrazolin-5-one intermediate used in Examples 14, 15 and 16.

Example 14.—4-[(3-ethyl-2-benzothiazolinylidene)-1-phenylethylidene]-1-phenyl-2-pyrazolin-5-one

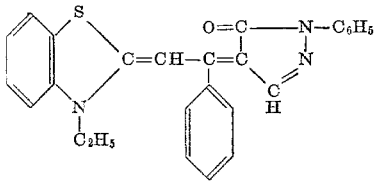

A mixture of 2.6 g. (1 mol.) of 1-phenyl-4-(1-phenylethylidene)-2-pyrazolin-5-one, 4.1 g. mol.+25% excess) of 3-ethyl-2-ethylthiobenzothiazolium ethylsulfate and 1.3 g. (1 mol.+25% excess) of triethylamine is heated in 50 ml. of ethanol at the refluxing temperature for 30 minutes. The reaction mixture is poured into water. After chilling, the solid is collected on a filter and washed with methanol. The crude dye is dissolved in hot pyridine, the solution is filtered and cooled, then ether is added, the precipitate is collected and recrystallized from methanol (250 ml./g.). The yield of red needles is 8% with a melting point of 244–245° C., with decomposition.

Example 15.—4-[(1-ethyl-4(1H)-quinolylidene)-1-phenylethylidene]-1-phenyl-2-pyrazolin-5-one

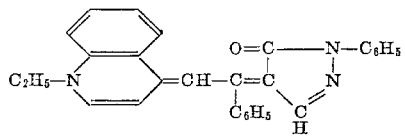

A mixture of 2.6 g. (1 mol.) of 1-phenyl-4-(1-phenylethylidene)-2-pyrazolin-5-one, 4.4 g. (1 mol.) of 1-ethyl-4-phenylthioquinolinium iodide and 1.3 g. (1 mol.+25% excess) of triethylamine is treated as in Example 14. After two recrystallizations from methanol (115 ml./g.), the yield of green crystals with a shiny reflex was 17% with a melting point of 164–165° C., with decomposition.

Example 16.—1-phenyl-4-[1,3,3-trimethyl-2-indolinylidene)-1-phenyl-2-butenylidene]-2-pyrazolin-5-one

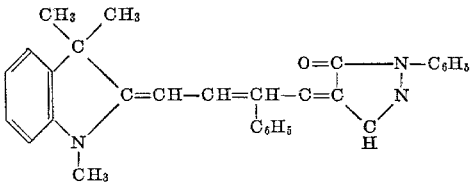

In the same manner as Example 14, 1-phenyl-4-[(1,3,3-trimethyl - 2 - indolinylidene)-1-phenyl-2-butenylidene]-

2-pyrazolin-5-one is prepared from 2.6 g. (1 mol.) of 1-phenyl-4-(1-phenylethylidene)-2-pyrazolin-5-one, 4.5 g. (1 mol.) of 2-(2-acetanilidovinyl) - 1,3,3 - trimethylindolinium iodide and 1.1 g. (1 mol.+10% excess) in 50 ml. of ethanol. The crude dye is dissolved in hot pyridine, the pyridine solution is filtered and methanol is added to the filtrate. After chilling the solution and collecting the dye, the above purification step is repeated. The yield of shiny green needles is 17% with a melting point of 231–232° C., with decomposition.

Example 17.—4-[(3-ethyl-2-benzothiazolinylidene) ethylidene]-3-phenyl-2-isoxazolin-5-one

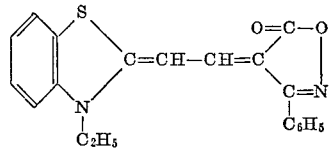

A mixture of 0.8 g. (1 mol.) of 3-phenyl-2-isoxazolin-5-one and 2.3 g. of 2-(2-acetanilidovinyl)-3-ethylbenzothiazolium iodide is refluxed in 10 ml. of pyridine for 10 minutes. The reaction mixture is cooled, the solid collected on a filter and washed with methanol. After two recrystallizations from methanol (280 ml./g.), the yield of dye is 62% with a melting point of 267–268° C., with decomposition.

Example 18.—1-phenyl-4-(1-phenylethylidene)-2-pyrazolin-5-one

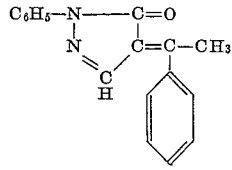

A mixture of 32 g. (1 mol.) of 1-phenyl-2-pyrazolin-5-one, 24 g. (1 mol.) of acetophenone and 1 ml. of piperidine is heated for 4 hours at 130° C. using an oil bath. The reaction mixture is dissolved in benzene, the solution is filtered and the product is precipitated by the addition of high boiling ligroin. The yield of colorless crystals is 86% with a melting point of 103–104° C.

The effectiveness of the quaternated merocyanine dyes of Examples 1 to 13 as electron acceptors and spectral sensitizers for fogged direct positive photographic materials was determined by the exact test procedure described in above Example 1. The results are recorded in the following table.

Example 19

To 9.0 pounds of silver chloride gelatin emulsion containing an equivalent of 100 grams of silver nitrate is added 0.017 gram of 1,3-diethyl-2-[(2-methyl-5-oxo-3-phenyl - 3 - isoxazolin-4-yl)vinyl]imidazo[4,5b]quinovalinium iodide (Example 1). The emulsion is coated on a non-glossy paper support, adn is flashed with white light to phenyl - 3 - isoxazolin-4-yl)vinyl]imidazo[4,5-b]quinoxagive a density of 1.2 when developed in the following developer, diluted 1 part to 2 parts of water:

| | Grams |
|---|---|
| N-methyl-p-aminophenol sulfate | 3.1 |
| Sodium sulfite, des. | 45 |
| Hydroquinone | 12 |
| Sodium carbonate, des. | 67.5 |
| Potassium bromide | 1.9 |
| Water to 1 liter. | |

The light fogged material can be exposed to an image with light modulated by a Wratten No. 15 filter to give a direct positive image. Generally similar results are obtained when the dye of Example 2 is used in place of the above dye.

Example 20

Seven pounds of a silver chloride gelatin emulsion containing the equivalent of 100 g. of silver nitrate is heated to 40° C. and the pH is adjusted to 7.8. Eight cc. of full strength (40%) formalin solution is added and the emulsion is held at 40° C. for 10 minutes. At the end of the holding period, the pH is adjusted to 6.0 and 0.125 g. of 1-methyl-3-[(2-methyl-5-oxo-3-phenyl-3-isoxazolin-4-yl)methylene]-3-phenyl-3H-indolium iodide is added (Example 3). The emulsion is coated on a support, and provides good direct positive images. Similar results are obtained when the dyes of Example 4 and Example 5 are substituted for the above dye.

By substituting other dye compounds of the invention, as defined in Formulas I to V above, into the procedure of the above examples, similar fogged, direct positive photographic silver halide emulsions and photographic elements may be prepared.

The photographic silver halide emulsion and other layers present in the photographic elements made according to the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, par-

TABLE 1

| | | | Density | | |
|---|---|---|---|---|---|
| Dye of Example No. | Dye conc., g./mole silver | Relative clear speed | Max. unexposed areas | Min. exposed areas | Sensitizing max. (nm.) |
| 1 | 0.90 | 1,150 | 1.82 | .36 | 495 |
| 2 | 0.90 | 1,380 | 1.66 | .22 | 510 |
| 3 | 0.90 | 436 | 1.84 | .56 | |
| 4 | 0.60 | 603 | 1.74 | 1.05 | 500 |
| 5 | 0.10 | 479 | 2.26 | .60 | 520 |
| 6 | 0.40 | 871 | 1.30 | | Blue |
| 7 | 0.44 | 138 | 1.86 | | 475 |
| 8 | 0.44 | 110 | 1.82 | | 450 |
| 9 | 0.44 | 240 | 1.72 | | |
| 10 | 0.45 | 417 | 1.96 | | 480 |
| 11 | 0.35 | 363 | 1.84 | .84 | Blue |
| 12 | 0.60 | 692 | 2.36 | 1.44 | 540 |
| 13 | 0.10 | 525 | 2.34 | 1.18 | 530 |
| Control | 0.00 | <1 | 1.90 | No reversal | |

The minimum density for the samples with Dyes 6, 7, 8, 9 and 10 are not available, although direct positive images are obtained. The sensitizing maximum of Dyes 3 and 9 are not available.

The following examples further illustrate the preparation of fogged, direct positive photographic emulsions and elements with the cyanine dyes of the invention.

ticularly those known to be beneficial in photographic emulsions, including, for example, lubricating materials, stabilizers, speed increasing materials, absorbing dyes, plasticizers, and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the direct positive photographic silver halide emulsion using any suitable technique, e.g., techniques of the type shown in Jelley et al. U.S. Pat. 2,322,027, issued June 15, 1943, Fierke et al. U.S. Pat. 2,801,171, issued July 30, 1957, Fisher U.S. Pats. 1,055,155 and 1,102,028, issued Mar. 4, 1913 and June 30, 1914, respectively, and Wilmanns U.S. Pat. 2,186,849 issued Jan. 9, 1940. They can also be developed using incorporated developers such as polyhydroxybenzenes, aminophenols, 3-pyrazolidones, and the like.

Although the invention has been described in considerable detail with particular reference to certain preferred embodiments thereof, it will be understood that variations and modifications can be effected within the spirit and scope of the invention as described hereinabove, and as defined in the appended claims.

We claim:

1. A fogged direct positive photographic silver halide emulsion containing at least one quaternated merocyanine dye comprising first and second 5- to 6-membered nitrogen heterocyclic nuclei joined by a linkage selected from the group consisting of a methine, a dimethine or a trimethine linkage; the first of said nuclei being selected from the group consisting of a 2-isoxazolin-5-one nucleus joined at the 4-carbon atom thereof to said linkage; a 2-pyrazolin-5-one nucleus joined at the 4-carbon atom thereof to said linkage, and a pyrimidinedione nucleus joined at the 3-carbon atom thereof to said linkage, said pyrimidinedione nucleus having attached to the nitrogen atom in the 5-position and the carbon atom in the 6-position thereof, the non-metallic atoms to complete a fused ring containing from 5 to 6 atoms; and said second nucleus being joined at a carbon atom thereof to said linkage to complete said quaternated merocyanine dye.

2. A direct positive emulsion in accordance with claim 1 wherein said second nucleus is a desensitizing nucleus.

3. A direct positive emulsion in accordance with claim 1 wherein said second nucleus is a desensitizing nucleus selected from the group consisting of a nitrobenzoxazole nucleus, a nitrobenzothiazole nucleus, a nitroselenazole nucleus, an imidazo[4,5-b]quinoxaline nucleus and a 1-alkyl-2-aryl-3H-indole nucleus.

4. A direct positive emulsion in accordance with claim 1 in which the said silver halide is present in the form of chemically fogged silver halide grains.

5. A direct positive emulsion in accordance with claim 1 in which the said silver halide is present in the form of reduction and gold fogged silver halide grains.

6. A fogged direct positive emulsion in accordance with claim 1 containing a photographic color coupler dispersed in a photographic coupler solvent.

7. A direct positive, photographic emulsion in accordance with claim 1 which comprises fogged silver halide grains, said grains being such that a test portion thereof, when coated as a photographic silver halide emulsion on a support to give a maximum density of at least about 1 upon processing for 6 minutes at about 68° F. in Kodak DK–50 developer, has a maximum density which is at least about 30% greater than the maximum density of an identical coated test portion which is processed for 6 minutes at about 68° F. in Kodak DK–50 developer after being bleached for about 10 minutes at about 68° F. in a bleach composition of:

Potassium cyanide—50 mg.
Acetic acid (glacial)—3.47 cc.
Sodium acetate—11.49 g.
Potassium bromide—119 mg.
Water to 1 liter 8. A direct positive, photographic emulsion in accordance with claim 1 which comprises fogged silver halide grains, at least 95%, by weight, of said grains having a diameter which is within about 40% of the mean grain diameter.

9. A fogged direct positive photographic silver halide emulsion containing at least one quaternated merocyanine dye selected from those represented by one of the following formulas:

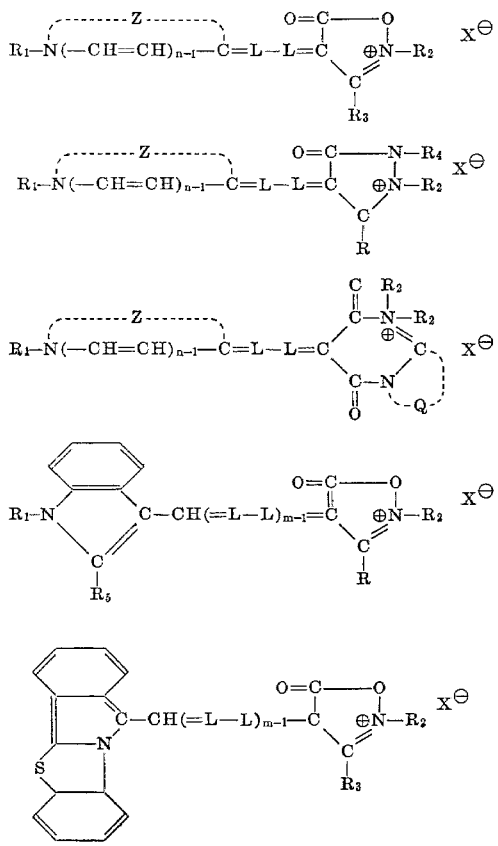

wherein $n$ and $m$ each represents a positive integer of from 1 to 2; L represents a methine linkage; $R_1$ and $R_2$ each represents a member selected from the group consisting of an alkyl group, and an alkenyl group; R represents a member selected from the group consisting of a hydrogen atom, an alkyl group and an aryl group, $R_3$ and $R_4$ each represents a member selected from the group consisting of an alkyl group and an aryl group; $R_5$ represents an aryl group; X represents an acid anion; Z represents the non-metallic atoms required to complete a heterocyclic nucleus containing from 5 to 6 atoms in the heterocyclic ring; and Q represents the non-metallic atoms required to complete a fused heterocyclic ring containing from 5 to 6 atoms in said ring.

10. A direct positive emulsion in accordance with claim 9 wherein said Z represents the non-metallic atoms required to complete a desensitizing nucleus.

11. A direct positive emulsion in accordance with claim 9 wherein said Z represents the non-metallic atoms required to complete a desensitizing heterocyclic nucleus selected from the group consisting of a nitrobenzothiazole nucleus, a nitrobenzoxazole nucleus, a nitrobenzoselenazole nucleus, an imidazo[4,5-b]quinoxaline nucleus, and a 1-alkyl-2-aryl-3H-indole nucleus.

12. A direct positive emulsion in accordance with claim 9 wherein said Q represents the non-metallic atoms required to complete a fused heterocyclic ring selected from the group consisting of a thiazole ring, an oxazole ring, a selenazole ring, a thiazoline ring, a pyridine ring, a quinoline ring, a 3,3-dialkylindolenine ring and an imidazole ring.

13. A direct positive emulsion in accordance with claim 9 in which the said silver halide is present in the form of chemically fogged silver halide grains.

14. A direct positive emulsion in accordance with claim 9 in which the said silver halide is present in the form of reduction and gold fogged silver halide grains.

15. A direct positive emulsion in accordance with claim 9 containing a photographic color coupler dispersed in a photographic coupler solvent.

16. A direct positive photographic emulsion in accordance with claim 9 which comprises fogged silver halide grains, said grains being such that a test portion thereof, when coated as a photographic silver halide emulsion on a support to give a maximum density of at least about 1 upon processing for 6 minutes at about 68% F. in Kodak DK–50 developer, has a maximum density which is at least about 30% greater than the maximum density of an identical coated test portion which is processed for 6 minutes at about 68° F. in Kodak DK–50 developer after being bleached for about 10 minutes at about 68° F. in a bleach composition of:

Potassium cyanide—50 mg.
Acetic acid (glacial)—3.47 cc.
Sodium acetate—11.49 g.
Potassium bromide—119 mg.
Water to 1 liter 17. A direct positive photographic emulsion in accordance with claim 9 which comprises fogged silver halide grains, at least 95%, by weight, of said grains having a diameter which is within about 40% of the mean grain diameter.

18. A direct positive emulsion in accordance with claim 17 wherein said dye is selected from the group consisting of a 1,3-diethyl-2-[(2-methyl-5-oxo-3-phenyl-3-isoxazolin-4-yl)vinyl]imidazo[4,5-b]quinoxalinium salt;
a 3-ethyl-2-[(2-methyl-5-oxo-3-phenyl-3-isoxazolin-4-yl)vinyl]-6-nitrobenzothiazolium salt;
a 1-methyl-3-[(2-methyl-5-oxo-3-phenyl-3-isoxazolin-4-yl)methylene]-2-phenyl-3H-indolium salt;
2-[(2,3-dimethyl-5-oxo-1-phenyl-3-pyrazolin-4-yl)vinyl]-1,3-diethylimidazo[4,5-b]quinoxalinium salt;
a 2-[(2,3-dimethyl-5-oxo-1-phenyl-3-pyrazolin-4-yl)vinyl]-3-ethyl-6-nitrobenzothiazolium salt;
a 11-[(2-methyl-5-oxo-3-phenyl-3-isoxazolin-4-yl)methylene]isoindolo[1,2-b]benzothiazolium salt;
a 3-ethyl-2-[(2-methyl-5-oxo-1-phenyl-3-pyrazolin-4-yl)2-phenylvinyl]benzothiazolium salt;
a 1-ethyl-4-[(2-methyl-5-oxo-1-phenyl-3-pyrazolin-4-yl)-2-phenylvinyl]quinolinium salt;
a 1,3,3-trimethyl-2-[(2-methyl-5-oxo-1-phenyl-3-pyrazolin-4-yl)-4-phenyl-1,3-butadienyl]-2-indolinium salt;
a 1,3,3-trimethyl-2-[(2-methyl-5-oxo-3-phenyl-3-isoxazolin-4-yl)vinyl]-2-indolinium salt;
a 3-ethyl-2-[(2-methyl-5-oxo-3-phenyl-3-isoxazolin-4-yl)vinyl]benzothiazolium salt;
a 3-[(1,3-diethyl-2(1H)-imidazo[4,5-b]-quinoxalinylidene)ethylidene]-3,4-dihydro-1-methyl-2,4-dioxo-2H-pyrido[1,2-a]pyrimidinium salt;
and a 3-[(1,3-diethyl-2(1H)-imidazo[4,5-b]quinoxalinylidene)ethylidene]-3,4-dihydro-1-methyl-2,4-dioxo-2H-pyrimido[2,1-b]benzothiazolium salt.

19. A photographic element comprising a support having thereon at least one layer containing a direct positive emulsion of claim 1.

20. A photographic element comprising a support having thereon at least one layer containing a direct positive emulsion of claim 7.

21. A photographic element comprising a support having thereon at least one layer containing a direct positive emulsion of claim 8.

22. A photographic element comprising a support having thereon at least one layer containing a direct positive emulsion of claim 9.

23. A photographic element comprising a support having thereon at least one layer containing a direct positive emulsion of claim 16.

24. A photographic element comprising a support having thereon at least one layer containing a direct positive emulsion of claim 17.

References Cited
UNITED STATES PATENTS 2,454,629  11/1948  Brooker _____ 96—105
2,656,352  10/1953  Knott et al. _____ 96—105

J. TRAVIS BROWN, Primary Examiner

U.S. Cl. X.R.
96—101, 105, 106